United States Patent
Yang et al.

(10) Patent No.: US 11,955,717 B2
(45) Date of Patent: Apr. 9, 2024

(54) LOADING BLOCKS FOR ANTENNAS IN SYSTEM PACKAGING

(71) Applicant: Apple Inc., Cupertino, CA (US)

(72) Inventors: Thomas Wu Yang, Los Altos, CA (US); Michael D. Quinones, Los Gatos, CA (US); Harish Rajagopalan, San Jose, CA (US); Gareth L. Rose, San Francisco, CA (US); Bhaskara R. Rupakula, Sunnyvale, CA (US); Jiechen Wu, Santa Clara, CA (US); Hao Xu, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 170 days.

(21) Appl. No.: 17/471,037

(22) Filed: Sep. 9, 2021

(65) Prior Publication Data

US 2023/0071858 A1    Mar. 9, 2023

(51) Int. Cl.
| | |
|---|---|
| *H01Q 21/08* | (2006.01) |
| *H01Q 1/22* | (2006.01) |
| *H01Q 13/06* | (2006.01) |
| *H04B 7/0413* | (2017.01) |
| *H04B 7/12* | (2006.01) |

(52) U.S. Cl.
CPC ........... *H01Q 21/08* (2013.01); *H01Q 1/2283* (2013.01); *H01Q 13/06* (2013.01); *H04B 7/0413* (2013.01); *H04B 7/12* (2013.01)

(58) Field of Classification Search
CPC ...... H01Q 1/2283; H01Q 1/243; H01Q 13/00; H01Q 13/06; H01Q 9/0485; H01Q 21/28; H01P 3/122; H01P 3/16; H01P 7/10; H01L 2223/6627
See application file for complete search history.

(56) References Cited

U.S. PATENT DOCUMENTS

| | | | |
|---|---|---|---|
| 7,088,290 B2 | 8/2006 | Ohno et al. | |
| 7,161,555 B2 | 1/2007 | Ohno et al. | |
| 7,423,604 B2 * | 9/2008 | Nagai | H01Q 21/064 343/786 |

(Continued)

FOREIGN PATENT DOCUMENTS

| | | | |
|---|---|---|---|
| CN | 113594700 A | * | 11/2021 |
| JP | 4004674 B2 | | 11/2007 |

OTHER PUBLICATIONS

Bijumon, P.V., et al., "Enhanced Bandwidth Microstrip Patch Antennas Loaded With High Permittivity Dielectric Resonators," Microwave and Optical Technology Letters. Nov. 20, 2002; 35 No. 4, pp. 327-330.

*Primary Examiner* — Ab Salam Alkassim, Jr.
*Assistant Examiner* — Leah Rosenberg
(74) *Attorney, Agent, or Firm* — Fletcher Yoder, P.C.

(57) ABSTRACT

A radio frequency system package may include waveguides and loading blocks. The loading blocks may include dielectric material having a high dielectric constant between 13 and 20. Additionally, the loading blocks may be made of mold, epoxy, or the like material, and the loading blocks may fit into a region cut out of the waveguides. Moreover, the loading blocks may lower the cut-off frequency for wireless communication otherwise provided by the waveguides without the loading blocks (e.g., 28 GHz). In particular, the loading blocks may facilitate communication in low mmWave frequencies, such as 24 GHz.

24 Claims, 7 Drawing Sheets

(56) References Cited

U.S. PATENT DOCUMENTS

| | | | |
|---|---|---|---|
| 2006/0132380 A1* | 6/2006 | Imai | H01Q 13/06 |
| | | | 343/911 L |
| 2016/0322708 A1* | 11/2016 | Tayfeh Aligodarz | ........................ |
| | | | H01Q 21/0087 |
| 2021/0013569 A1 | 1/2021 | Rahiminejad et al. | |
| 2021/0159606 A1* | 5/2021 | Mercer | H01Q 21/24 |

* cited by examiner

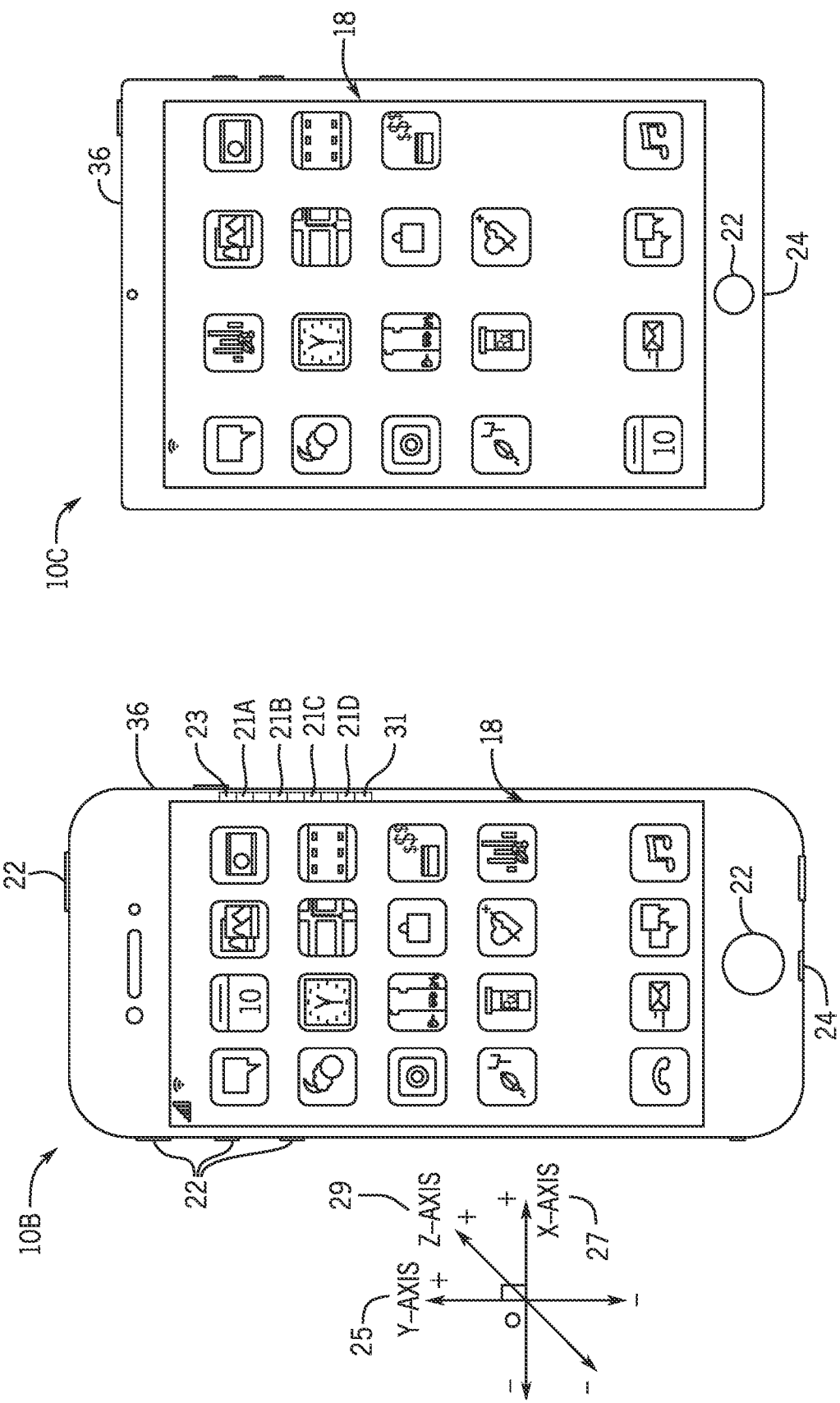

LOADING BLOCKS FOR ANTENNAS IN SYSTEM PACKAGING

BACKGROUND

The present disclosure relates generally to wireless communication systems and devices and, more specifically, to improving wireless communications in the systems and devices while conserving space.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Generally, a radio frequency device may a chip carrier package, such as a system-in-package (SiP). A system-in-package incorporates substrates, dies, multiple integrated circuits, antennas, and/or other passive devices into a single package. The radio frequency device may support wireless communication over various frequency bands. In particular, the system-in-package of the radio frequency device may include waveguides that confine and direct energy of wireless signals, such as electromagnetic energy, from one point to another to facilitate the wireless communication. The waveguides may be formed in various shapes, such as rectangular or a circular (e.g., a rectangular or circular pipe, tube, cable, etc.). Additionally, the size, shape, and dimension of the waveguides (e.g., cross-section of the waveguides) may correspond to a cut-off frequency. That is, signals communicated over frequencies above the cut-off frequency may propagate through the waveguides with decreased or minimal attenuation while signals communicated below the cut-off frequency may be attenuated. As such, the size, shape, and/or the dimensions of the waveguides in the system-in-package may correlate to the frequency bands to be used for the wireless communication (e.g., tall waveguides to support a broad range of frequency bands). In particular, a depth of the waveguides inversely correlates to the cut-off frequencies. That is, as the overall depth of the waveguides increase, the cut-off frequency decreases.

The radio frequency device may communicate wireless signals over low frequencies, such as millimeter wave (mmWave) range frequencies, which include frequencies between approximately 24 gigahertz (GHz) to 300 GHz. To support the wireless communications at a low cut-off frequency (e.g., 24 GHz) for the mmWave range frequencies while reducing or mitigating signal attenuation, the system-in-package of the radio frequency device may include large waveguides (e.g., 1 millimeter or greater in depth). However, fitting large waveguides in the system-in-package to support the mmWave communications may take up space, increase an opening for the system-in-package in the radio frequency device, and undesirably increase the size of the radio frequency devices.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, an antenna array package includes multiple antennas and multiple waveguides. The multiple antennas transmit wireless signals and the multiple waveguides include multiple loading blocks. The multiple waveguides direct the wireless signals from the multiple antennas and through the multiple loading blocks. The multiple loading blocks include a dielectric material.

In another embodiment, a radio frequency system package includes one or more antennas, one or more waveguides, and one or more loading blocks. The one or more antennas transmit and receive wireless signals and the one or more waveguides direct the wireless signals from the one or more antennas. Moreover, the one or more loading blocks enable the one or more waveguides to direct the wireless signals over a range of millimeter wave (mmWave) frequencies.

In yet another embodiment, a waveguide module of an antenna array package includes one or more waveguides and one or more loading blocks. The one or more waveguides direct wireless signals communicated from the antenna array package. The one or more loading blocks are coupled to the one or more waveguides, in which the one or more loading blocks include dielectric material that has a dielectric constant of at least 13.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 3 is a front view of a handheld device representing another embodiment of the electronic device of FIG. 1;

FIG. 4 is a front view of another handheld device representing another embodiment of the electronic device of FIG. 1;

DETAILED DESCRIPTION OF SPECIFIC EMBODIMENTS

Figure 1:
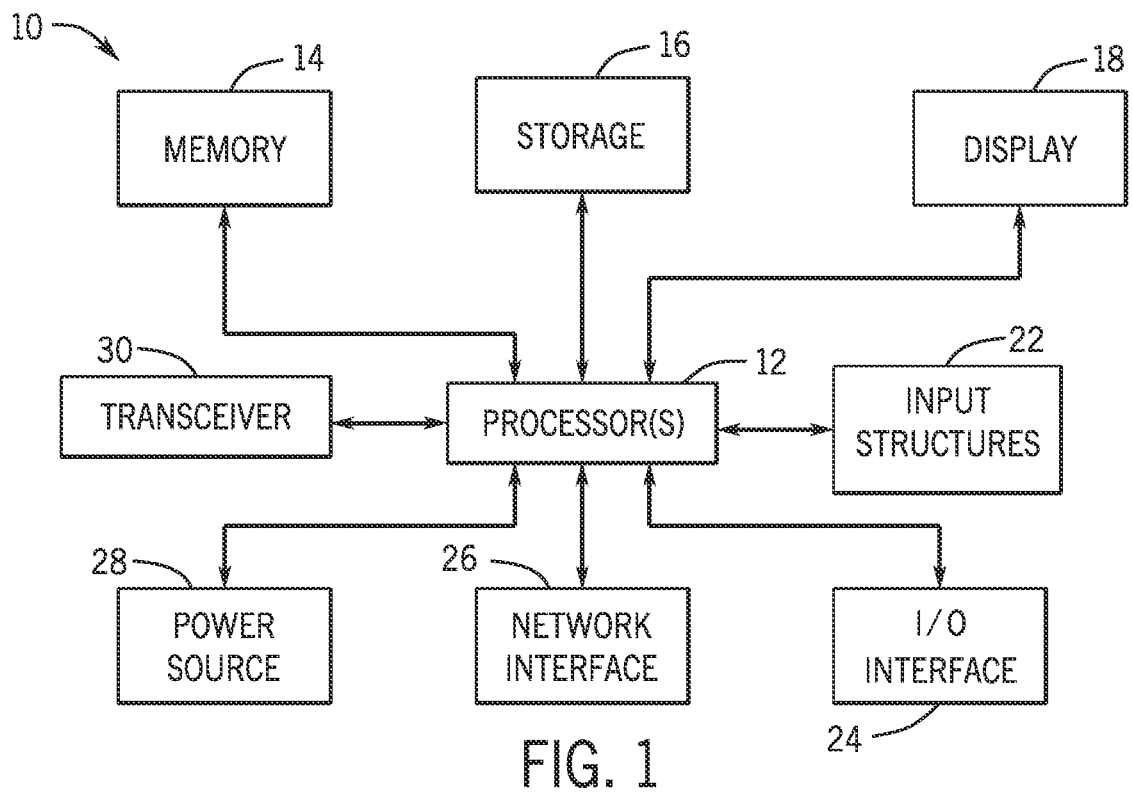
FIG. 1 is a block diagram of an electronic device, according to an embodiment of the present disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment", "an embodiment", or "some embodiments" of the present disclosure are not intended to be interpreted as excluding the existence of additional embodiments that also incorporate the recited features. Use of the term "approximately" or "near" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on).

The present disclosure provides techniques for conserving space in a system package (e.g., a system-in-package) of an antenna array module of a radio frequency device while increasing the range of frequencies for communicating wireless signals from antennas of the system package. In particular, the techniques may include conserving space in the package of the radio frequency device, for example, while supporting wireless communication over a broad range of frequencies. The broader range of frequencies may include lower frequencies of the millimeter wave (mmWave) range frequencies (e.g., 24 gigahertz (GHz) to 300 GHz), such as at least 24 GHz.

As will be discussed herein, conserving space within the system package for efficient packaging may include using loading blocks formed from mold and/or high dielectric constant (Dk) material. In particular, a cutoff frequency of signals sent front antennas of the radio frequency device may be defined by the depth of waveguides of the system package. The cutoff frequency and the depth of the waveguides may be inversely correlated. That is, as the depth of the waveguide increases, the cutoff frequency decreases. However, increasing the depth of the waveguides may increase the overall depth of the system package. A dielectric constant of the waveguides (e.g., material of the waveguides) may also define the cutoff frequency, and the cutoff frequency and the dielectric constant of the waveguides may also be inversely related. That is, as the dielectric constant increases, the cutoff frequency may decrease.

The dielectric constant may be increased by adding dielectric material to the materials of the waveguides. As such, adding dielectric material to the waveguides (e.g., in place of at least some of the waveguides) may enable communicating the wireless signals at a desired cutoff frequency with a decreased depth than without using dielectric materials (e.g., increasing the depth of the waveguides). That is, using loading blocks of dielectric material (e.g., mold with a high dielectric constant) may effectively provide the same advantage of increasing the depth of the waveguides and/or an opening for the system package, increasing the range of frequencies (e.g., lower end of mmWave frequencies) and decreasing the cut-off frequency for communicating the wireless signals. Moreover, using mold as the material for forming the loading blocks, in which the mold flows and fits a designated area of the system package, may also reduce or prevent increasing the depth of the waveguides. By way of example, the loading blocks may enable the antennas of the system package to communicate at approximately 24 GHz.

Enabling communication of the wireless signals over low mmWave frequencies and an overall broader range of frequencies may enable various countries that use different frequencies of the broad range of frequencies for respective communication standards to use the same system package. Thus, manufacturing the system package with the loading blocks may avoid manufacturing custom system packages for each of the countries to communicate over the various different frequencies. Additionally, since the loading blocks are made of mold and/or dielectric material, the loading blocks may be formed in parallel with manufacturing the rest of the system package that includes mold (e.g., antenna array package). That is, each of the portions of the system package may be manufactured at the same or approximately the same time, such that the loading blocks are not manufactured during a separate manufacturing period. In this manner, manufacturing a single design of the system package described herein may facilitate communication in multiple countries, as well as decrease manufacturing costs otherwise associated with custom system packages for each of the countries and/or forming portions of the system package using different manufacturing process at different manufacturing times.

Turning first to FIG. 1, an electronic device 10 according to an embodiment of the present disclosure may include, among other things, one or more processor(s) 12, memory 14, nonvolatile storage 16, a display 18, input structures 22, an input/output (I/O) interface 24, a network interface 26, a power source 28, and a transceiver 30. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in electronic device 10.

Figure 2:
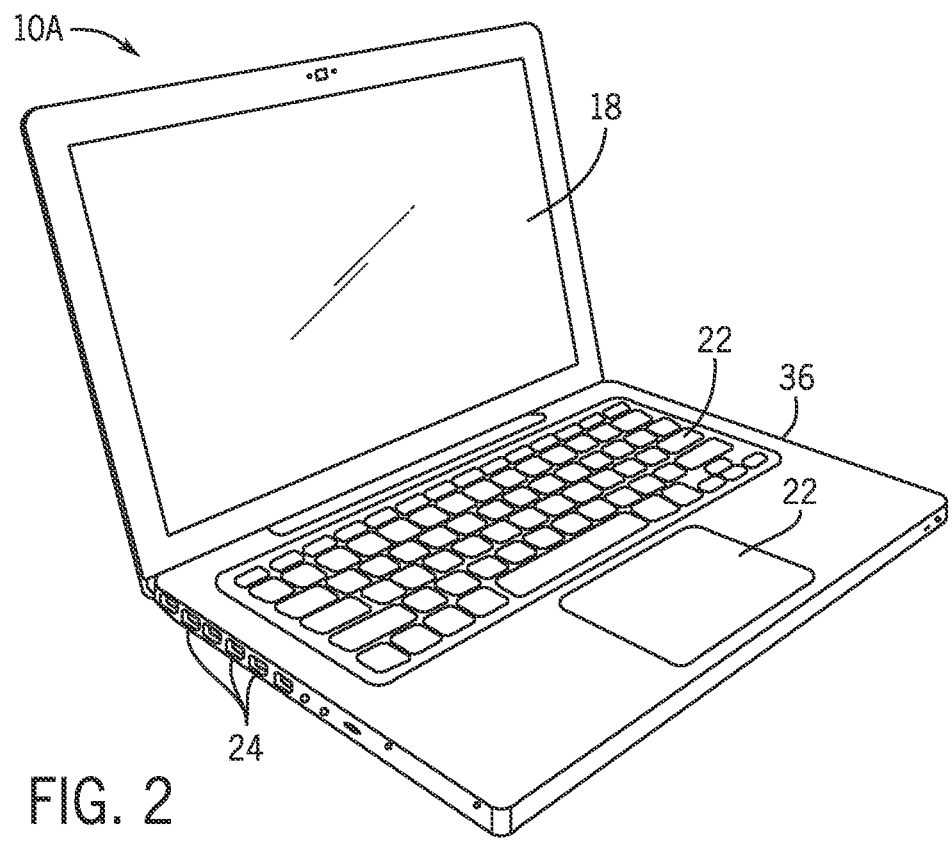
FIG. 2 is a perspective view of a notebook computer representing an embodiment of the electronic device of FIG. 1.
Figure 5:
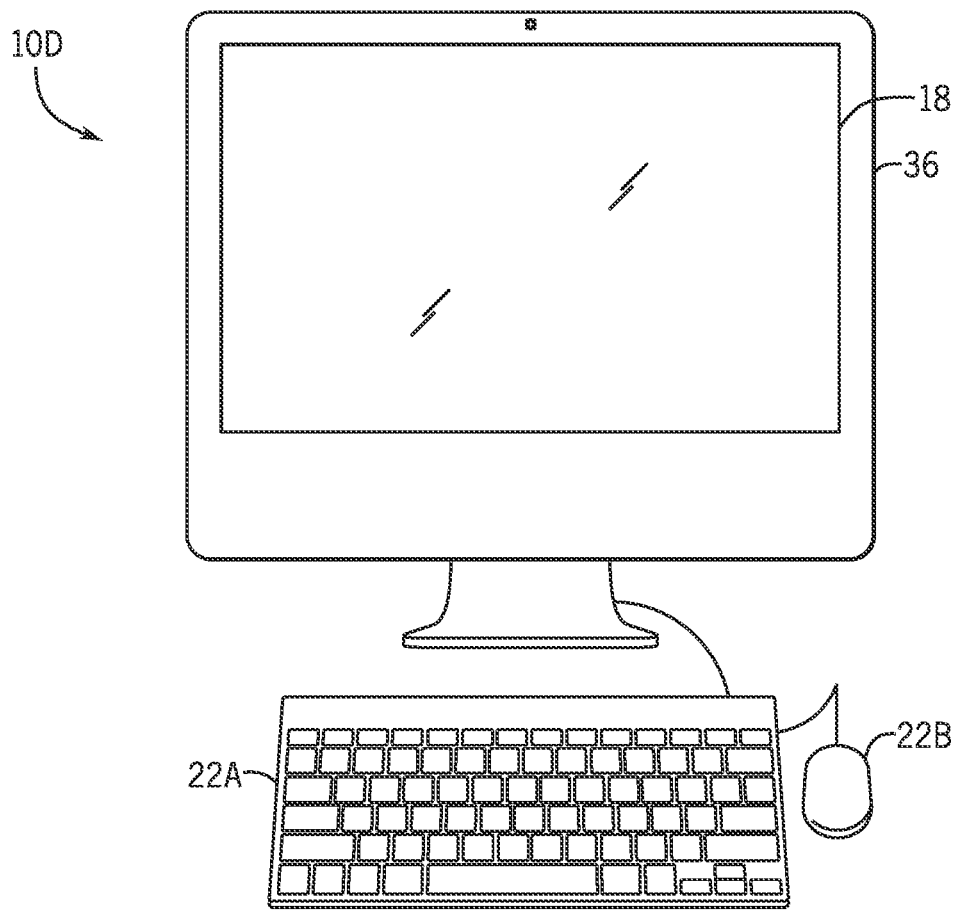
FIG. 5 is a front view of a desktop computer representing another embodiment of the electronic device of FIG. 1.
Figure 6:
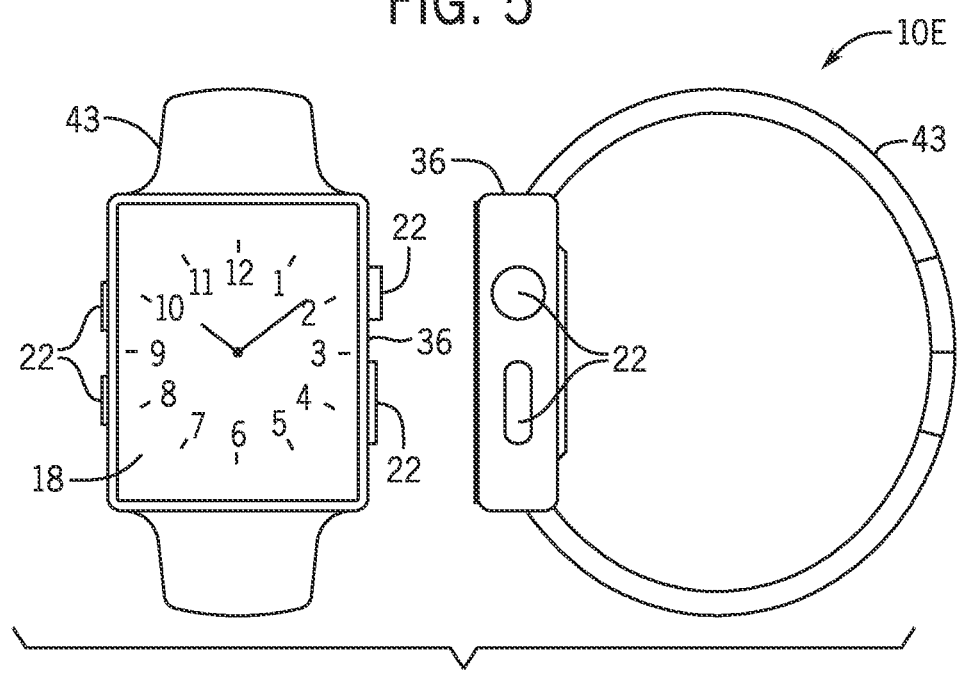
FIG. 6 is a front view and side view of a wearable electronic device representing another embodiment of the electronic device of FIG. 1.

By way of example, the electronic device 10 may represent a block diagram of the notebook computer depicted in FIG. 2, the handheld device depicted in FIG. 3, the handheld device depicted in FIG. 4, the desktop computer depicted in FIG. 5, the wearable electronic device depicted in FIG. 6, or similar devices. It should be noted that the processor(s) 12 and other related items in FIG. 1 may be generally referred to herein as "data processing circuitry." Such data processing circuitry may be embodied wholly or in part as software, hardware, or any combination thereof. Furthermore, the processor(s) 12 and other related items in FIG. 1 may be a single contained processing module or may be incorporated wholly or partially within any of the other elements within the electronic device 10.

In the electronic device 10 of FIG. 1, the processor(s) 12 may be operably coupled with a memory 14 and a nonvolatile storage 16 to perform various algorithms. For example, algorithms for adjusting input/output power of antennas when operating at particular frequencies, such as millimeter wave frequencies, may be saved in the memory 14 and/or nonvolatile storage 16. Such algorithms or instructions executed by the processor(s) 12 may be stored in any suitable article of manufacture that includes one or more tangible, computer-readable media. The tangible, computer-readable media may include the memory 14 and/or the nonvolatile storage 16, individually or collectively, to store the algorithms or instructions. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor(s) 12 to enable the electronic device 10 to provide various functionalities.

In certain embodiments, the display 18 may be a liquid crystal display (LCD), which may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more light-emitting diode (LED) displays, organic light-emitting diode (OLED) displays, active-matrix organic light-emitting diode (AMOLED) displays, or some combination of these and/or other display technologies.

The input structures 22 of the electronic device 10 may enable a user to interact with the electronic device 10 (e.g., pressing a button to increase or decrease a volume level). The I/O interface 24 may enable the electronic device 10 to interface with various other electronic devices, as may the network interface 26. The network interface 26 may include, for example, one or more interfaces for a personal area network (PAN), such as a BLUETOOTH® network, for a local area network (LAN) or wireless local area network (WLAN), such as an 802.11x WI-FED network, and/or for a wide area network (WAN), such as a 3 rd generation (3G) cellular network, universal mobile telecommunication system (UMTS), 4th generation (4G) cellular network, long term evolution (LTE®) cellular network, long term evolution license assisted access (LTE-LAA) cellular network, 5th generation (5G) cellular network, and/or New Radio (NR) cellular network. In particular, the network interface 26 may include, for example, one or more interfaces for using a Release-15 cellular communication standard of the 5G specifications that include the millimeter wave (mmWave) frequency range (e.g., 24-300 GHz). The transceiver 30 of the electronic device 10, which includes the transmitter and the receiver, may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

In some embodiments, the electronic device 10 communicates over the aforementioned wireless networks (e.g., WI-FIC), WIMAX®, mobile WIMAX®, 4G, LTE®, 5G, and so forth) using the transceiver 30. The transceiver 30 may include circuitry useful in both wirelessly receiving the reception signals at the receiver and wirelessly transmitting the transmission signals from the transmitter (e.g., data signals, wireless data signals, wireless carrier signals, radio frequency signals). Indeed, in some embodiments, the transceiver 30 may include the transmitter and the receiver combined into a single unit, or, in other embodiments, the transceiver 30 may include the transmitter separate from the receiver. The transceiver 30 may transmit and receive radio frequency signals to support voice and/or data communication in wireless applications such as, for example, PAN networks (e.g., BLUETOOTH®), WLAN networks (e.g., 802.11x WI-FTC)), WAN networks (e.g., 3G, 4G, 5G, NR, and LTE® and LTE-LAA cellular networks), WIMAX® networks, mobile WIMAX® networks, ADSL and VDSL networks, DVB-T® and DVB-H® networks, UWB networks, and so forth. As further illustrated, the electronic device 10 may include the power source 28. The power source 28 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may be generally portable (such as laptop, notebook, and tablet computers), or generally used in one place (such as desktop computers, workstations, and/or servers). In certain embodiments, the electronic device 10 in the form of a computer may be a model of a MacBook®, MacBook® Pro, MacBook Air®, iMac®, Mac® mini, or Mac Pro® available from Apple Inc. of Cupertino, California. By way of example, the electronic device 10, taking the form of a notebook computer 10A, is illustrated in FIG. 2 in accordance with one embodiment of the present disclosure. The depicted notebook computer 10A may include a housing or enclosure 36, a display 18, input structures 22, and ports of an I/O interface 24. In one embodiment, the input structures 22 (such as a keyboard and/or touchpad) may be used to interact with the computer 10A, such as to start, control, or operate a graphical user interface (GUI) and/or applications running on computer 10A. For example, a keyboard and/or touchpad may allow a user to navigate a user interface and/or an application interface displayed on display 18.

FIG. 3 depicts a front view of a handheld device 10B, which represents one embodiment of the electronic device 10. For reference, a three-dimensional coordinate axis is provided having an x-axis along a horizontal axis of the electronic device 10, a y-axis along a vertical axis of the electronic device 10, and a z-axis along a depth axis of the electronic device 10. The handheld device 10B may represent, for example, a portable phone, a media player, a personal data organizer, a handheld game platform, or any combination of such devices. By way of example, the handheld device 10B may be a model of an iPhone® available from Apple Inc. of Cupertino, California. The handheld device 10B may include an enclosure 36 to protect interior components from physical damage and/or to shield them from electromagnetic interference. The enclosure 36 may surround the display 18. The I/O interfaces 24 may open through the enclosure 36 and may include, for example, an I/O port for a hardwired connection for charging and/or content manipulation using a standard connector and protocol, such as the Lightning connector provided by Apple Inc. of Cupertino, California, a universal serial bus (USB), or other similar connector and protocol. The I/O interfaces 24 may be associated with wiring and connectors within the radio frequency packaging of the electronic device 10. The wiring and connectors may reduce available space for placing large waveguides (e.g., approximately greater than 0.5 millimeter (mm) in width along the x-axis 27 and greater than 1 mm in depth along the z-axis 29) that facilitate supporting wireless communications over a broad range of frequencies. As shown, the electronic device 10 may include one or more antennas 21 of one or more antenna array packages 23 disposed at an opening 31 of the enclosure 36. In the depicted embodiment, the electronic device 10 includes the antenna array package 23 with a first antenna 21A, a second antenna 21B, a third antenna 21C, and a fourth antenna 21D. The antennas 21 may transmit wireless signals over the broad range of frequencies, through the opening 31. As will be discussed herein, including loading blocks with a particular dielectric constant may enable wireless communications over low frequencies, including at least 24 GHz.

The input structures 22, in combination with the display 18, may allow a user to control the handheld device 10B. For example, the input structures 22 may activate or deactivate the handheld device 10B, navigate user interface to a home screen, a user-configurable application screen, and/or activate a voice-recognition feature of the handheld device 10B. Other input structures 22 may provide volume control, or may toggle between vibrate and ring modes. The input structures 22 may also include a microphone that may obtain a user's voice for various voice-related features, and a speaker that may enable audio playback and/or certain phone capabilities. The input structures 22 may also include a headphone input that may provide a connection to external speakers and/or headphones.

FIG. 4 depicts a front view of another handheld device 10C, which represents another embodiment of the electronic device 10. The handheld device 10C may represent, for example, a tablet computer, or one of various portable computing devices. By way of example, the handheld device 10C may be a tablet-sized embodiment of the electronic device 10, which may be, for example, a model of an iPad® available from Apple Inc. of Cupertino, California.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a MacBook®, or other similar device by Apple Inc. of Cupertino, California. It should be noted that the computer may also represent a personal computer (PC) by another manufacturer. A similar enclosure 36 may be provided to protect and enclose internal components of the computer 10D, such as the display 18. In certain embodiments, a user of the computer 10D may interact with the computer using various peripheral input structures 22, such as the keyboard 22A or mouse 22B (e.g., input structures 22), which may connect to the computer 10D.

Similarly, FIG. 6 depicts a wearable electronic device 10E representing another embodiment of the electronic device 10 of FIG. 1 that may be configured to operate using the techniques described herein. By way of example, the wearable electronic device 10E, which may include a wristband 43, may be an Apple Watch® by Apple Inc. of Cupertino, California. However, in other embodiments, the wearable electronic device 10E may include any wearable electronic device such as, for example, a wearable exercise monitoring device (e.g., pedometer, accelerometer, heart rate monitor), or other device by another manufacturer. The display 18 of the wearable electronic device 10E may include a touch screen display 18 (e.g., LCD, LED display, OLED display, active-matrix organic light emitting diode (AMOLED) display, and so forth), as well as input structures 22, which may allow users to interact with a user interface of the wearable electronic device 10E.

Figure 7:
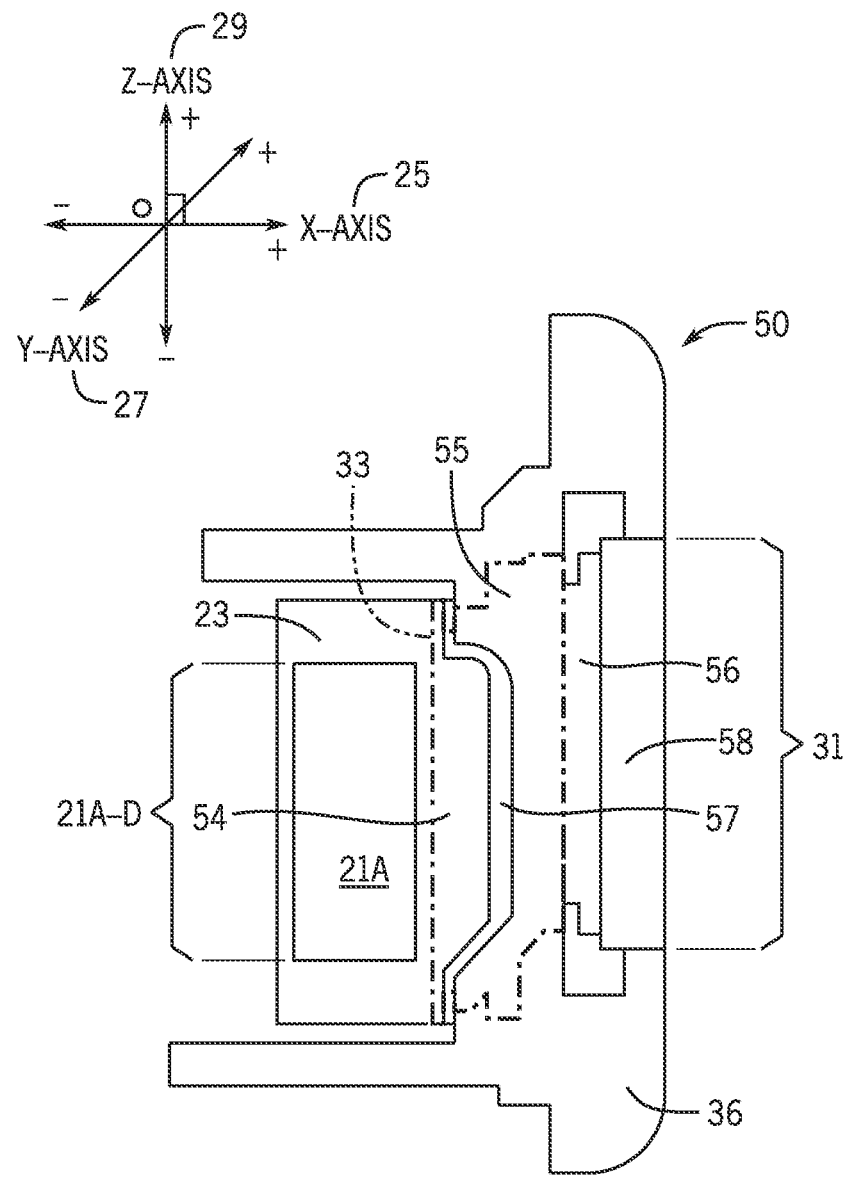
FIG. 7 is a cutaway diagram of a side view of a system package of an antenna array module of the electronic device of FIG. 1 having loading blocks, according to embodiments of the present disclosure.

With the foregoing in mind, FIG. 7 is cutaway diagram of a side view of a system package 50 of an antenna array module of the electronic device 10 of FIG. 1 having loading blocked. Although the depicted embodiment shows the system package 50 of a particular portion (e.g., a side) of the electronic device 10, the system package 50 may be disposed in any area of the electronic device 10 that includes antennas 21. By way of example, an antenna array of the system package 50 disposed on the right side (e.g., in a positive x-axis 27 direction) of the electronic device 10 may radiate signals toward the right direction (e.g., in the positive x-axis 27 direction). Similarly, the antenna array of the system package 50 disposed on the left side (e.g., in the negative x-axis 27 direction) of the electronic device 10 may radiate signals to the left (e.g., in the negative x-axis 27 direction). The antenna array of the system package 50 disposed at a front glass 58 side (e.g., front surface panel) may radiate signals in a positive y-axis 25 direction, and the antenna array of the system package 50 disposed at a back glass side (e.g., rear surface) of the electronic device 10 may be radiate signals in the negative y-axis 25 direction.

As shown, the system package 50 may include an enclosure 36, an antenna array package 23, a loading block 54, a waveguide 55, an adhesive 56, and a glass module 58. Although the depicted embodiment shows a portion of the antenna array package 23 coupled to a single loading block 54, the system package 50 may include one or more antennas 21 (e.g., antennas 21 of FIG. 3) of the antenna array package 23, in which the one or more antennas 21 are coupled to corresponding one or more loading blocks 54. For example, the number of loading blocks may correspond to the number of antennas 21 of the antenna array package 23. In some embodiments, a single loading block may corresponding to multiple antennas 21, such as two, three, four, and so forth. In either embodiment, the antenna array package 23 may include one or more antennas 21 that transmit and receive wireless signals. Specifically, the antennas 21 may include low-band antennas, mid-band antennas, and high-band antennas. The low-band antennas may enable communication in low-band frequencies, such as 210 MHz to 1.0 GHz while the mid-band antennas may enable communication in mid-band frequencies, such as 1.8 GHz to 2.2 GHz. The high-band antennas may enable communication in high-band frequencies, such as 20 GHz to 80 GHz. Each of the antennas 21 may send wireless signals that are combined to form a beam (e.g., a beamformed signal) in a particular direction over a particular frequency, such as for communicating over the mmWave frequency.

The antennas 21 may radiate the wireless signals through the opening 31 in the electronic device 10 of the system package 50 that is proximate the waveguides 55. That is, the waveguide 55 may guide the wireless signals through an opening 31 of the enclosure 36. Briefly, and as will be discussed in detail herein, the dimensions of the waveguide 55, such as the depth of the waveguide 55 along a z-axis 29, may correlate to the dimensions of the opening 31 (e.g., the size of the opening 31 along the z-axis 29). Moreover, the depth along the z-axis 29 of the waveguide 55 and/or the size of the opening 31 may directly correspond to the bandwidth and/or inversely correspond to the cut-off frequency for the wireless signals. For example, a relatively larger depth of the waveguide 55 and/or the size of the opening 31 along the z-axis 29 may correspond to enabling transmission and/or reception of signals having a broader bandwidth and a lower cut-off frequency than a relatively smaller depth of the waveguide 55 and/or relatively smaller size of the opening 31.

Generally, the waveguide 55 confines and directs energy (e.g., of wireless signals) from one region to another of the system package 50 and/or from the wireless electronic device 10. For example, and as previously mentioned, the waveguide 55 guides the wireless signals through the opening 31. Typically, the waveguide 55 is a hollow metal tube (often rectangular or circular in cross section) that is capable of directing wireless signals precisely in a particular direction. Moreover, the waveguide 55 may be one of various shapes, such as a rectangle and/or a circle (e.g., a rectangular or circular pipe, tube, cable, etc.). The waveguide 55 may also direct power and function as a high-pass filter. That is, the size, shape, and dimensions of the waveguide 55 (e.g., cross-section of the waveguide 55) may correspond to cut-off frequencies, as previously mentioned.

The waveguide 55 functioning as a high-pass filter may enable the wireless signals communicated over frequencies above the cut-off frequency to propagate through the waveguide with decreased or minimal attenuation, while attenuating signals communicated below the cut-off frequency. The cut-off frequency for communicating the wireless signals from the antennas of the antenna array package 23 of the system package 50 may be based on the dimensions of the opening 31 (such as the depth of the opening 31 along the z-axis 29) and/or the size of the waveguide 55 along the z-axis 29. As such, the size, shape, and/or the dimensions of the waveguide 55 in the system package 50 may correlate to the frequency bands used for the wireless communication. By way of example, increasing the depth of the waveguide 55 and the size opening 31 in the z-axis 29 enables communication in a broader range of frequency bands. Moreover, the dimensions of the waveguide 55 inversely correlate to the cut-off frequencies. In particular, as the waveguide 55 increases in depth along the z-axis 29, the cut-off frequency decreases so that the electronic device 10 may communicate at lower frequencies, such as the mmWave range frequencies. Thus, increasing the depth of the waveguide 55 along the z-axis 29 increases the communication range of frequencies for communicating (e.g., broadband) and enables communicating at lower frequencies, such as for mmWave frequency.

Specifically, as the waveguide 55 increases in depth along the z-axis 29, the system package 50 may correspondingly increase in depth along the z-axis 29, and the size of the opening 31 of the electronic device 10 that accommodates the system package 50 may correspondingly increase. That is, at least the depth of the electronic device 10 along the z-axis 29 may increase as a result of increasing the depth of the waveguide 55 along the z-axis 29. For example, the waveguide 55 may have a depth of 1 millimeter (mm) along the z-axis 29 that corresponds to a cut-off frequency of approximately 26-28 GHz. As such, increasing the depth of the waveguide 55 along the z-axis 29, such as to 4.1 mm, may correspond to a cut-off frequency of approximately 24 GHz. However, as previously mentioned, increasing the depth of the waveguide 55 may correspondingly increase the depth of the system package 50 and undesirably increase the size of the electronic device 10 in the z-axis 29 direction. As such, to increase bandwidth while enabling the electronic device 10 to communicate at low frequencies (e.g., at mmWave frequencies) without increasing the depth of the system package 50 and the size of the opening 31 for the system package 50 along the z-axis 29, the system package 50 may include the loading block 54.

In general, a combination of one or more waveguides 55 and one or more loading blocks 54 may be referred to as a waveguide module 33 (e.g., of the antenna array package 23). The loading block 54 may attach to, be a part of, or include the waveguide 55. For example, portion of the waveguide 55 may be cut out to accommodate the dimensions of the loading block 54. In this manner, the opening 31 for the system package 50 in the z-axis 29 direction may not increase. However, the electronic device 10 may communicate the wireless signals over more frequencies and at lower frequencies. As will be discussed in detail with respect to FIG. 8, the loading block 54 enables a greater range of frequency to be emitted through a waveguide 55 and an opening 31 than without the loading block 54, by "electrically increasing" the depth of the waveguide 55 and the size of the opening 31 for the waveguide 55 along the z-axis 29 without physically increasing the depth and size along the z-axis 29. In particular, a dielectric loading of the waveguide 55 may lower the cut-off frequency provided by the dimensions of the waveguide 55, and the loading block 54 includes dielectric material that increases the dielectric loading of the waveguide 55. As such, the loading block 54 effectively provides the benefit otherwise provided by increasing the height of the waveguide 55 and the size of the opening 31 along the z-axis 29, thus "electrically increasing" the height of the waveguide 55 and the size of the opening 31.

Moreover, removing, decreasing, or cutting out a portion of the waveguide 55 to accommodate the loading block 54 may create an air gap 57. The waveguide 55 may be composed of mold and/or plastic (e.g., injection-molded plastic). The size of the loading block 54 may be based on mechanical considerations of the waveguide 55. In particular, the waveguide 55 may provide mechanical support to components of the system package 50 and, as such, the portion cut out from the waveguide 55 that accommodates the loading block 54 may include any suitable dimension of cutout to continue providing support to the components. Additionally, the air gap 57 between the loading block 54 and the waveguide 55 may facilitate a movement tolerance that enables movement or precision placement of the loading block 54 and the waveguide 55 within the system package 50. In particular, the air gap 57 may enable the loading block 54 to move up or down along the y-axis 25. The dimensions (e.g., size) of the air gap 57 may also contribute to the bandwidth and/or the cutoff frequency for wireless communications. That is, the air gap 57 may also facilitate communication in the mmWave frequency range.

In some embodiments, the loading blocks 54 may directly couple or attach to the antennas 21 (e.g., antenna 21A (as shown) and antennas 21B-D below antenna 21A along the y-axis 25) of the antenna array package 23 along the x-axis 27 (e.g., rather than by attaching on top of or below the antennas 21 of the antenna array package 23 along the z-axis 29 via the adhesive 56). In this manner, the dielectric constant of the waveguide 55 in conjunction with the dimensions of the waveguide 55 and/or the opening 31 may enable the antennas 21 to communicate wireless signals on lower and/or a greater number of frequencies when compared to the dimensions of the waveguide 55 and/or the opening 31 alone (without the loading block 54). Enabling communication over lower frequencies and a broader range of frequencies also facilitates compliance with multiple communication standards. For example, different countries may use different frequencies of the broad range of frequencies for wireless communications. As such, the system package 50 with the loading blocks 54 that provides communication over the broad range of frequencies may facilitate wireless communication for multiple communication standards associated with multiple countries. Moreover, manufacturing the system package 50 with the loading blocks 54 may avoid manufacturing a custom system package 50 for each of the countries to communicate over the various different frequencies. In this manner, manufacturing a single design of the system package 50 described herein may facilitate communication in multiple countries, decreasing manufacturing costs otherwise associated with the custom system packages for each of the countries.

Figure 8:
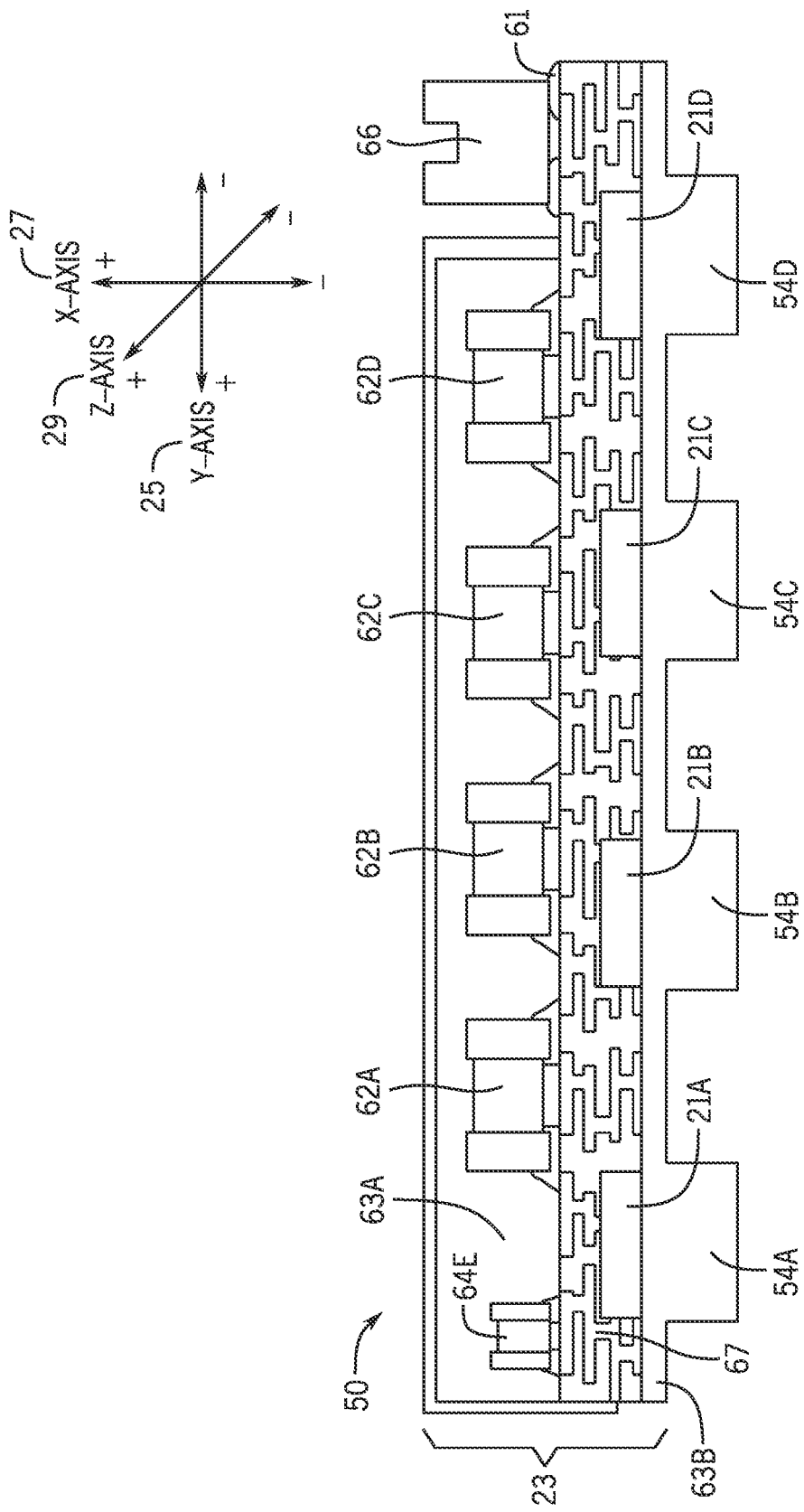
FIG. 8 is a cutaway diagram of a front view of the system package of FIG. 7, according to embodiments of the present disclosure.

FIG. 8 is a cutaway diagram of a side view of a system package 50 of an antenna array module of the electronic device 10 of FIG. 1, according to embodiments of the present disclosure. As shown and previously discussed, the system package 50 includes the antenna array package 23 and the loading blocks 54. Although the depicted embodiment and following descriptions describe four loading blocks 54 and four antennas 21 in the system package 50, which represents a particular embodiment, the system package 50 described herein may include any suitable number of antennas 21, loading blocks 54, or the like components (e.g., one, three, five, ten, and so forth).

The antenna array package 23 of the system package 50 may include one or more passive integrated circuitry or passive components 62, such as the depicted first passive component 62A, second passive component 62B, third passive component 62C, fourth passive component 62D, and fifth passive component 62E. The passive components 62 may include but are not limited to, resistors, inductors, and/or capacitors. Further, the passive components 62 may contribute to the dimensions of the system package 50, such as a depth of the system package 50 along the z-axis 29.

The system package 50 may include a first portion of mold 63A and a second portion of mold 63B that encapsulate and provide structural support to components in the respective portions (e.g., the passive components 60 in the first portion of the mold 63A). Generally, the mold 63 may be a cured resin or rubber that is fixed to the one or more components of the package 50. In other implementations, the mold 63 may be formed by solidification of a liquid, resin, or a gel deposited on the one or more components or a substrate. The liquid, resin, or gel may then be cured in place to produce the mold 63. As shown, the first portion of mold 63A encapsulates the passive components 62. In general, the mold 63 may encapsulate or encase silicon components, including the passive components 62 and/or other silicon components, in a system package 50, to provide structural support for the silicon components. Additionally or alternatively to encapsulating, the mold 63 may provide support in a substrate form. As shown, the second portion of mold 63B is a substrate that is coupled to or integrated with the loading blocks 54. The second portion of mold 63B also couples to antennas 21 to provide a structural or placement support for the antennas 21.

As shown, a dielectric substrate 67 may be placed on top of the second mold portion 63B and the passive components 62 may be placed on top of the dielectric substrate 67, in the positive z-axis 29. The dielectric substrate 67 may include materials with a high dielectric constant (Dk) (e.g., high Dk). In general, the dielectric constant is the ratio of the permittivity of a substance to the permittivity of free space, and high dielectric may store more energy than low dielectric materials. A "high dielectric" may refer to a dielectric constant between 3 and 20 and a "high dielectric material" may refer to one or more material (e.g., a combination of materials) having a high dielectric constant. As will be discussed herein, in some embodiments, the loading blocks 54 of high dielectric material may have a dielectric constant of approximately 13. In additional or alternative embodiments, the loading blocks may have a high dielectric constant between 14 and 19.

As the dielectric constant increases, the electric flux density increases to facilitate holding an electric charge for a period of time. In some embodiments, the system package 50 may also include one or more integrated circuits that facilitate communication with and between other integrated circuits, components, devices and so forth.

The system package 50 may also include a board-to-board (B2B) connector 66. The board-to-board connector 66 may connect to a cable that couples to another package and/or printed circuit board of the electronic device 10. By way of example, the cable and the board-to-board connector 66 may provide a connection to a main logic board of the electronic device 10. That is, the board-to-board connector 66 may include an interconnector for the system package 50, such as for providing an interconnection between components of the system package 50 and the main logic board. The system package 50 may also include solder balls or pads 61 disposed between components of the system package 50, such as but not limited to the passive components 62 and/or the board-to-board connector 66. The solder pads 61 include solder (e.g., lead, tin, low-melting alloy, and/or the like) that provide electrical connections between components to facilitate a communication path between the components (e.g., through the dielectric substrate 67).

Moreover, the system package 50 includes the antennas 21 that emit radio frequency signals through the loading blocks 54. Although the following descriptions describe four antennas 21 that corresponds to four loading blocks 54 (e.g., a 1:1 ratio), the system package 50 described herein may include one or more antennas 21 for each of the loading blocks 54 or one antenna 21 between multiple loading blocks 54. As shown, the system package 50 includes a first antenna 21A, a second antenna 21B, a third antenna 21C, and a fourth antenna 21D. Each of the antennas 21 may be aligned with a respective loading block 54 (e.g., in the x-axis 27 direction). That is, the first antenna 21A is aligned with a first loading block 54A, the second antenna 21B is aligned with a second loading block 54B, the third antenna 21C is aligned with a third loading block 54C, and the fourth antenna 21D is aligned with a fourth loading block 54D, in the z-axis 29 direction. The antennas 21 may radiate the wireless signals through the respective loading blocks 54 and the opening 31 for the system package 50, as guided by the waveguides 55.

As previously mentioned, the loading blocks 54 may increase the range of frequencies for communicating the wireless signals from the antennas 21, such as by enabling low frequencies (e.g., in the mmWave range). In particular, the dielectric loading of the loading blocks 54 may have a dielectric constant based on dielectric material. That is, the loading blocks 54 may be composed of dielectric material that has a high dielectric constant to increase the dielectric constant inside of the waveguide 55, enabling the antennas 21 to communicate wireless signals on lower and/or a greater number of frequencies compared to the dimensions of the waveguide 55 and/or the opening 31 alone (without the loading block 54).

Increasing the dielectric constant inside the waveguide 55 may correspondingly lower the cut-off frequency (e.g., cut-off or filtered by the waveguide 55 and/or the enclosure 36 surrounding the opening 31) and enable the antennas 21 to operate at relatively lower frequencies. For example, the antennas 21 of the system package 50 without the loading blocks 54 may communicate over a frequency range of 26 GHz to 30 GHz (e.g., 28 GHz), while the antennas 21 of the system package 50 with the loading blocks 54 may communicate over a frequency range of 20 GHz to 25 GHz (e.g., 24 GHz). As previously mentioned, the dielectric constant is the ratio of the permittivity of a substance to the permittivity of free space, and high dielectric materials may store more energy than low dielectric materials. As the dielectric constant increases, the electric flux density increases to facilitate holding an electric charge for a period of time. Thus, high dielectric material includes material that may store a large amount of energy charge for a period of time. Additionally, using the high dielectric material in the system package 50 may reduce power loss and reduce signal loss. By way of example, high dielectric constant material have include materials having dielectric constants of a range of 3.0 to 20.0. The high dielectric constant material of the loading blocks 54 may include dielectric material that is malleable to form into any shape suitable to fit inside the opening 31 for the system package 50 and/or based on the dimensions of the waveguide 55. The loading blocks 54 may, additionally or alternatively to the high dielectric constant material, include mold, epoxy, and the like. The loading blocks 54 in the high dielectric constant material, mold 63, and/or epoxy may initially be in a liquid form to flow and fit a designated area of the system package 50 (e.g., surrounding nearby components) and/or the electronic device 10. The liquid may harden to a solid or approximately sold material after a particular time period, facilitating an efficient process for forming the loading blocks 54. That is, flowing and surrounding nearby components may avoid a process of otherwise forming, cutting, and attaching each of the loading blocks 54 to a respective antennas 21 (e.g., avoiding iteratively attaching multiple loading blocks 54, one-at-a-time, to the antenna array package 23).

The loading blocks 54 may be tunable (e.g., adjustable) based on a concentration of the high dielectric constant material. That is, the electrical properties of dielectric material of the loading blocks 54 are based on the dielectric constant (Dk) and a dissipation factor (Df). The dissipation factor may include a measure of loss of energy, such as electrical potential energy dissipated in dielectric material (e.g., in the form of heat). The dielectric constant and/or the dissipation factor may change based on the amount of high dielectric constant material added or removed from the loading blocks 54. The dielectric materials of the embodiments described herein may have a high dielectric constant between 3.0 and 11.0 and a dissipation factor between 0.01 and 0.1 (e.g., better dielectric materials with less dielectric heating). As previously mentioned, the loading blocks 54 may be manufactured similarly to the manufacturing for semiconductor components, such that each of the loading blocks 54 are manufactured simultaneously or approximately simultaneously with the semiconductor components. In this manner, the system package 50 may manufacture each of the components of the system package 50 at the same or approximately the same time and avoid delays otherwise caused by multiple manufacturing processes and associated times. In some embodiments, the system package 50 may include loading blocks 54 formed from zirconia, ceramic, or like materials. In such embodiments, the loading blocks 54 may be formed, cut, and attached to the waveguides 55 via an adhesive. In contrast, loading blocks 54 made from mold and/or epoxy may couple to the waveguides 55 without cutting and attaching since the mold and/or epoxy may conform to fit the system package that includes the waveguides 55 (e.g., as discussed with respect to FIG. 10).

Figure 9:
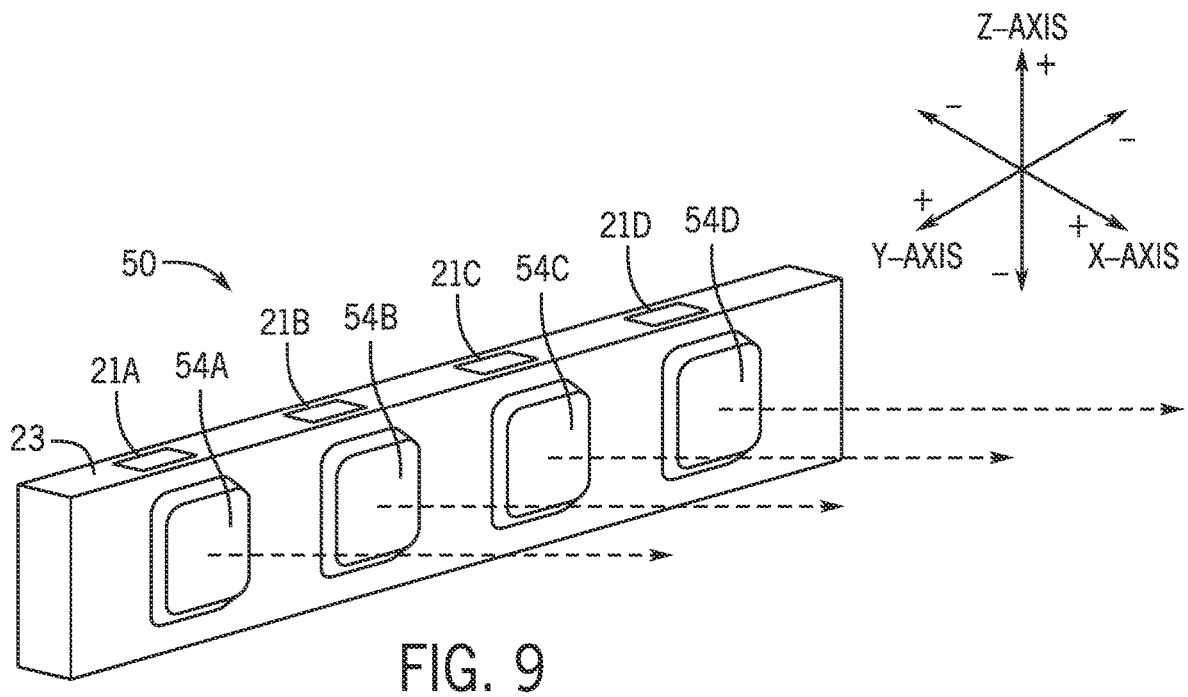
FIG. 9 is a perspective diagram of a top view of the system package of FIG. 8, according to embodiments of the present disclosure.

FIG. 9 is a perspective diagram of a top view of the system package 50 of FIG. 8, according to embodiments of the present disclosure. As shown, the system package 50 includes the antenna array package 23 and the loading blocks 54. As shown, the antennas 21 aligned with and/or affixed to respective loading blocks 54 may radiate the wireless signals (shown by dashed lines) as guided by the waveguides 55 and through the opening 31 of the system package 50. In particular, the antennas 21 radiating the wireless signals may include low-band antennas, mid-band antennas, and/or high-band antennas. As previously mentioned, the system package 50 without the loading blocks 54 may communicate signals having frequencies that are over approximately 28 GHz. To enable communicate over lower frequencies, the depth of the corresponding waveguides 55 and/or the size of the opening 31 of the system package 50 may be increased and/or the dielectric loads of the waveguides 55 may be increased (e.g., by increasing either the mass or the dielectric constant of the dielectric load).

By way of example, the dielectric load may be increased to enable communication over at least each of the mmWave frequencies, including the 24 GHz. As previously mentioned, the loading blocks 54 enable communication over a broader range of frequencies, such that the same system package 50 with the loading blocks 54 may comply with wireless communication standards for various countries. Moreover, forming the loading blocks 54 with dielectric material enables manufacturing the loading block at the same time as the rest of the components of the system package 50, reducing or avoiding manufacturing delays otherwise associated with manufacturing the loading blocks 54 separately and subsequently attaching them to components of the system package 50.

Figure 10:
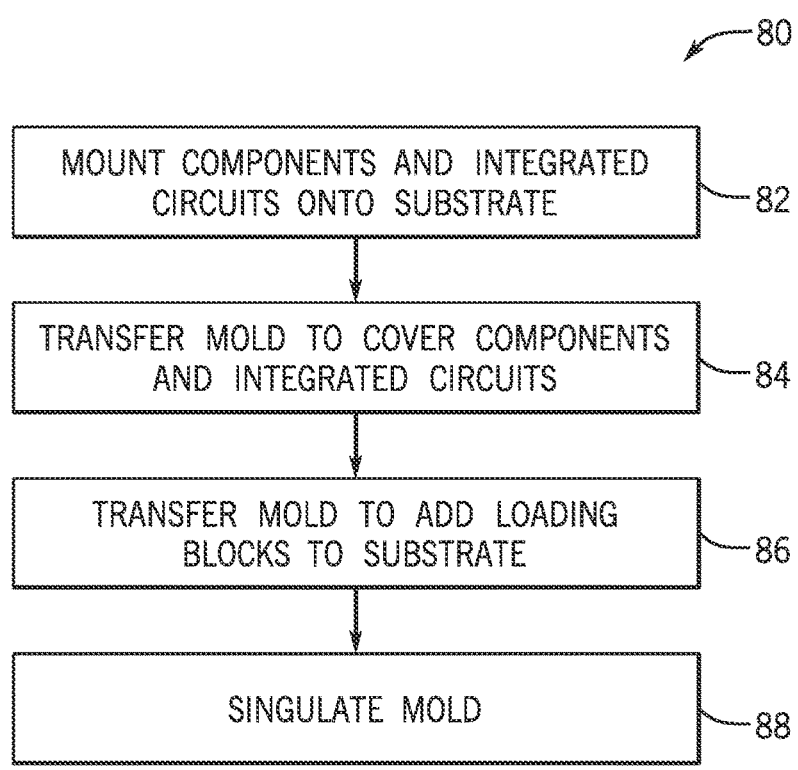
FIG. 10 is a process flow diagram of a method for forming the system package having the loading blocks, according to embodiments of the present disclosure.

FIG. 10 is a process flow diagram of a method 80 for forming the system package 50 with the loading blocks 54, according to embodiments of the present disclosure. At process block 82, components and integrated circuits are mounted onto a substrate (e.g., by manufacturing a printed circuit board (PCB)). That is, the components of the system package 50 may be placed on the PCB. Manufacturing the PCB may include a solder paste printer that applies solder paste using a stencil to pads on the PCB. A solder paste inspection (SPI) machine may inspect soldering paste volume per pad. Once the PCB passes inspection, the components and integrated circuits of the system package 50 (e.g., components 62 and/or antennas 21) may be placed in the packaging. An automated optical inspection (AOI) machine may verify correct placement and presence, type or value, and/or polarity, of each of the components. The PCB and the components may be placed in a reflow soldering machine where the electrical solder connections (e.g., solder pads 61) are formed between the components and PCB by heating the assembly to a suitable temperature. The AOI machine may verify that the solder joint quality is within a threshold for sufficient quality. In some embodiments, an x-ray machine may determine overall PCB quality, such as the solder joint quality, to identify less noticeable issues without damaging the PCB.

At process block 82, mold is transferred to cover the components and integrated circuits on the PCB. Process block 82 may refer to the manufacturing and molding process of the antenna array package 23, as described with respect to FIG. 8. During this processing step, casting material (e.g., mold material) may be forced into a mold cavity or the areas around the components and integrated circuits, and the mold cavity may be heated. The material may be solid or a liquid and initially loaded into a chamber (e.g., a pot). A plunger may force the material from the pot into the mold cavity. If the material is solid, the forcing pressure and mold cavity temperature may melt it to liquid form so that the material shapes into the intended shape and form. In general, transfer molding uses high pressures to uniformly fill the mold cavity so that the components are saturated by the material (e.g., encapsulated). In some embodiments, and as previously discussed, the material may include liquid, resin, and/or a gel material. In some instances, chemical reactions caused by heating the material and/or subjecting it to high pressure may result in unintended by-products. A post mold cure (PMC) process may expose part of the material to higher temperatures for a predetermined time (e.g., 200° C. for four hours) in order to speed up the curing process and to optimize some physical properties of the material, such as to remove the by-products.

At process block 86, mold is transferred to add the loading blocks 54. In general, process block 86 may refer to the manufacturing and molding process of the loading blocks 54, as described with respect to FIG. 8. The process block 86 includes the same transferring mold process described with respect to process block 84 but includes molding for the loading blocks 54 instead of the components. Additionally, at process block 86, the material may include the high dielectric constant material, epoxy, mold, and the like, similar to process block 54. As previously mentioned, the electrical properties of dielectric material of the loading blocks 54 are based on the dielectric constant and the dissipation factor, so the dielectric constant and/or the dissipation can change based on the amount of high dielectric constant material added or removed from the loading blocks 54. Since the transferring mold process for the loading blocks 54 and the antenna array package 23 includes the same general process, the loading blocks 54 may be manufactured at the same time as the rest of the system package 50, saving time and costs otherwise associated with manufacturing the loading blocks 54 separately. Specifically, transferring mold for the components (e.g., described with respect to process block 86) and transferring mold for the loading blocks 54 may occur in parallel by forming the mold through a left or right side along the x-axis 27 or the y-axis 25 into respective mold cavities.

After the mold hardens, at process block 88, the mold is singulated. A molding machine may divide the mold into individual pieces using a dicer of the molding machine. In some embodiments, the mold may be formed fitted to the antenna array package 23. In additional embodiments, a large panel of molding of the loading blocks 54 may be diced into smaller portions having dimension that corresponds to the antenna array package 23. In yet additional embodiments, the substrate of loading blocks 54 may be diced into individual units for individual attachment to the antenna array package 23. In this manner, the method 80 may form the system package 50 with the loading blocks 54.

Figure 11:
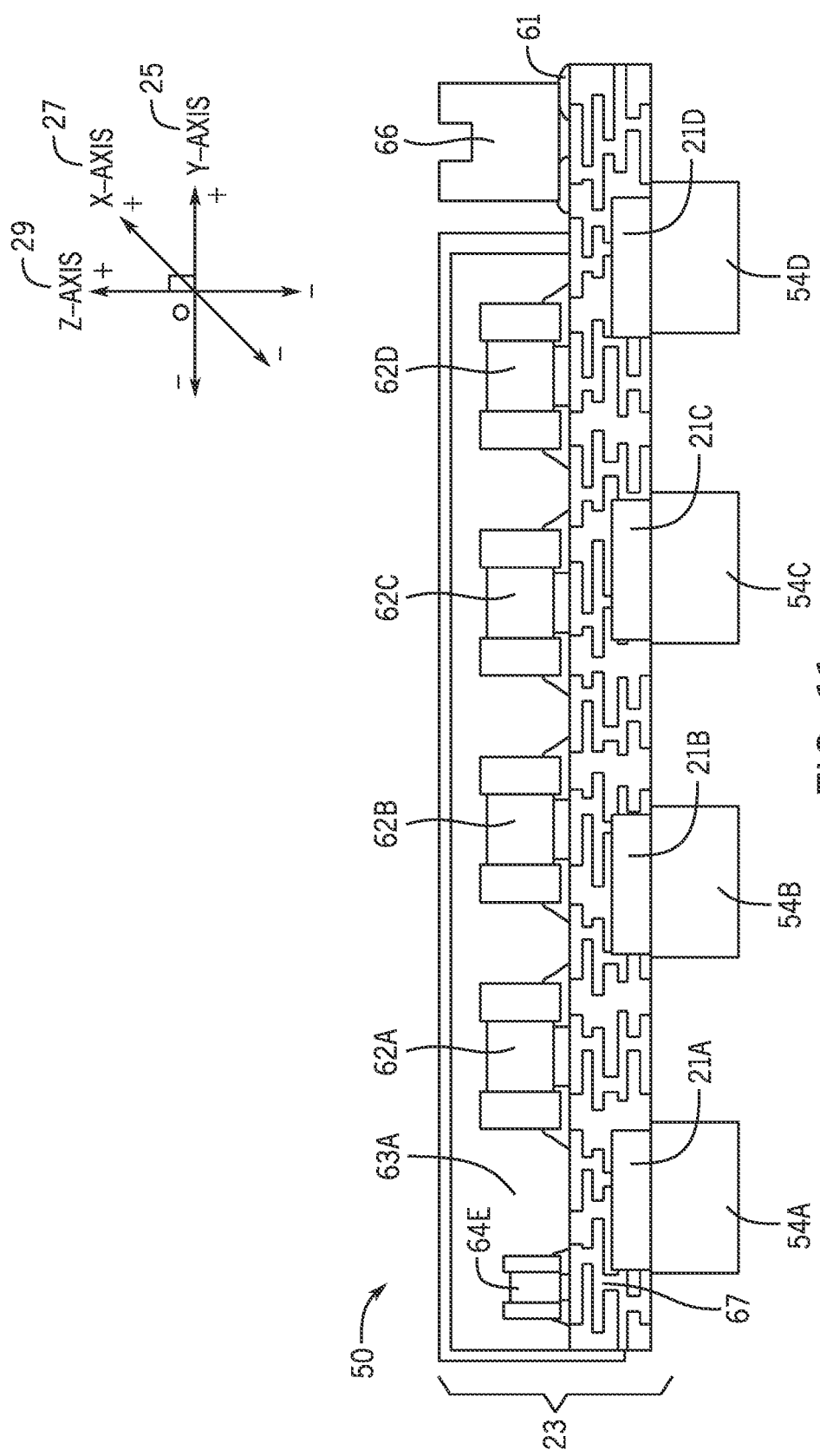
FIG. 11 is a schematic diagram of the system package of FIG. 8 without mold between a dielectric substrate and the loading blocks, according to embodiments of the present disclosure.

To enable even greater bandwidth and lower cut-off frequency, FIG. 11 is a schematic diagram of the system package 50 of FIG. 8 without mold between the dielectric substrate 67 and the loading blocks 54, according to embodiments of the present disclosure. The depicted system package 50 may include the same components and function similarly to the system package 50 described with respect to FIG. 8. However, in the embodiment depicted in FIG. 11, the system package 50 does not include the second mold portion 63B. As such, individual loading blocks (e.g., formed during the singulation process described with respect block 88 of FIG. 10) may directly attach to the dielectric substrate 67. Directly attaching may enable better cross-linking (e.g., electrical coupling) between the dielectric component 67 and the loading blocks 54 since there is a direct connection between organic materials (e.g., mold and dielectric materials). Since the depicted system package 50 does not include the second mold portion 63A of FIG. 8 and the overall dimensions of the system package 50 may be the same as depicted in FIG. 8, the loading blocks 54 may be larger than the system package 50. For example, the loading blocks 54 may have additional depth along the z-axis 29 corresponding to depth of the second mold portion 63B. As such, the relatively deeper loading blocks 54 may have a relatively greater bandwidth and lower cut-off frequency than the shorter loading blocks 54 of system package 50 of FIG. 8 that includes the second mold portion 63B.

In additional or alternative embodiments, the system package 50 may include an adhesive that attaches the individual loading blocks 54 to the dielectric substrate 67. The adhesive may include epoxy, glue, or the like, suitable to firmly attach the loading blocks 54 to the dielectric substrate 67. In other embodiments, the loading blocks 54 may attach to a metal chip that attaches to the dielectric substrate 67. In yet other embodiments, the loading blocks 54 may attach to the dielectric substrate 67, such that there is an air gap between the loading blocks 54 and the dielectric material 67. The air gap may provide flexibility and may be based on mechanical considerations associated with the dielectric substrate 67, the loading blocks 54, the system package 50 and/or the electronic device 10. The air gap may also contribute to the cut-off frequency and range of frequencies supported by the system package 50. The dimensions of the air gap may directly correlate to the cut-off frequency and inversely correlate to the bandwidth. That is, as the air gap increases (e.g., along the x-axis 27, the y-axis 25, and/or the z-axis 29), the cut-off frequency becomes higher and the bandwidth becomes lower. In other embodiments, the air gap may be filled with the epoxy, the glue, or the like, removing any space between the loading blocks 54 and dielectric substrate 67.

As such, the loading blocks 54 described herein may electrically increase the depth of the waveguides 55 and/or the size of the opening 31 for the system package 50 without physically increasing the depth of the electronic device 10 along the z-axis 29, enabling the antennas 21 of the antenna array package 23 to communicate wireless signals over low mmWave frequencies (e.g., 24 GHz) and a broad range of frequencies (e.g., above 24 GHz). Moreover, enabling communication over low frequencies and a broad range of frequencies may enable various countries that use different frequencies of the broad range of frequencies for respective wireless communications to use the same system package 50. Thus, manufacturing the system package 50 with the loading blocks 54 may be avoid manufacturing custom system packages 50 for each of the countries to communicate over the various different frequencies. Additionally, since the loading blocks 54 are made of mold and/or dielectric material, the loading blocks 54 may be formed in parallel with manufacturing the antenna array package that includes the mold. That is, each of the portions of the system package 50 may be manufactured at the same or approximately the same time, such that the loading blocks 54 are not manufactured during a separate manufacturing period. In this manner, manufacturing a single design of the system package 50 described herein may facilitate communication in multiple countries, as well as decrease manufacturing costs otherwise associated with the custom system packages for each of the countries and/or forming portions of the system package 50 using different manufacturing process at different manufacturing times.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. An antenna array package, comprising:
 a plurality of antennas configured to transmit wireless signals; and
 a waveguide module comprising:
  a plurality of waveguides;
  a plurality of loading blocks, wherein a waveguide of the plurality of waveguides is configured to direct a wireless signal of the wireless signals from an antenna of the plurality of antennas and a loading block of the plurality of loading blocks, the plurality of loading blocks comprising a dielectric material; and
  a plurality of air gaps, wherein an air gap of the plurality of air gaps is disposed between the waveguide and the loading block.

2. The antenna array package of claim 1, wherein the dielectric material comprises a dielectric constant between 3.0 and 20.0.

3. The antenna array package of claim 1, wherein each of the plurality of air gaps are configured to provide a movement tolerance between the plurality of loading blocks and the plurality of waveguides.

4. The antenna array package of claim 1, wherein the dielectric material comprises mold, epoxy, or both.

5. The antenna array package of claim 1, wherein respective loading blocks of the plurality of loading blocks are configured to fit within respective waveguides of the plurality of waveguides.

6. The antenna array package of claim 1, wherein the plurality of loading blocks couple to the plurality of waveguides.

7. The antenna array package of claim 1, wherein the plurality of antennas transmit the wireless signals over a frequency range of 24 gigahertz (GHz) to 300 GHz based at least in part on the plurality of loading blocks.

8. An antenna array package comprising:
 an antenna array; and
 a waveguide module comprising:
  a plurality of waveguides configured to direct wireless signals communicated from the antenna array;
  one or more loading blocks coupled to one or more antennas of the antenna array, the one or more loading blocks comprising dielectric material; and
  one or more air gaps, wherein an air gap of the one or more air gaps is disposed between a waveguide of the plurality of waveguides and a loading block of the one or more loading blocks.

9. The antenna array package of claim 8, wherein the dielectric material comprises zirconia, ceramic, or both.

10. The antenna array package of claim 8, wherein the one or more loading blocks are configured to provide an increased frequency range for communicating the wireless signals relative to the waveguide module without the one or more loading blocks.

11. The antenna array package of claim 10, wherein the frequency range comprises a millimeter wave (mmWave) range.

12. The antenna array package of claim 8, wherein the one or more loading blocks comprise mold.

13. The antenna array package of claim 8, wherein the one or more loading blocks comprise epoxy.

14. An antenna array package, comprising:
 one or more antennas configured to transmit and receive wireless signals; and
 a waveguide module comprising:
  a plurality of waveguides configured to direct the wireless signals from the one or more antennas;
  one or more loading blocks configured to enable the plurality of waveguides to direct the wireless signals over a range of millimeter wave (mmWave) frequencies; and
  one or more air gaps, wherein an air gap of the one or more air gaps is disposed between a waveguide of the plurality of waveguides and a loading block of the one or more loading blocks.

15. The antenna array package of claim 14, wherein the range of mmWave frequencies comprises at least a frequency of 24 gigahertz.

16. The antenna array package of claim 14, wherein the one or more loading blocks comprise dielectric material having a dielectric constant between 13 and 19.

17. The antenna array package of claim 14, wherein the one or more loading blocks comprise dielectric material having a dielectric dissipation between 0.01 and 0.1.

18. The antenna array package of claim 14, wherein the waveguide is coupled to the loading block.

19. The antenna array package of claim 14, wherein the range of mmWave frequencies is based at least in part on a size of the one or more air gaps.

20. The antenna array package of claim 1, wherein the dielectric material has a dielectric constant of at least 13.

21. The antenna array package of claim 1, wherein the plurality of waveguides is configured to direct the wireless signals over a range of millimeter wave (mmWave) frequencies.

22. The antenna array package of claim 8, wherein the one or more loading blocks are configured to enable the plurality of waveguides to direct the wireless signals over a range of millimeter wave (mmWave) frequencies.

23. The antenna array package of claim 14, wherein the one or more loading blocks comprise a dielectric material having a dielectric constant of at least 13.

24. The antenna array package of claim 1, wherein a frequency range of the waveguide module is based on a size of the air gap.

* * * * *